(12) United States Patent
Fu et al.

(10) Patent No.: US 11,378,713 B2
(45) Date of Patent: Jul. 5, 2022

(54) METHOD FOR COLLECTING AND PROCESSING TENSOR ARTIFICIAL-SOURCE ELECTROMAGNETIC SIGNAL DATA AND DEVICE THEREOF

(71) Applicant: Institute of Geology and Geophysics, Chinese Academy of Sciences, Beijing (CN)

(72) Inventors: Changmin Fu, Beijing (CN); Qingyun Di, Beijing (CN)

(73) Assignee: Institute of Geology and Geophysics, Chinese Academy of Sciences

( * ) Notice: Subject to any disclaimer, the term of this patent is extended or adjusted under 35 U.S.C. 154(b) by 114 days.

(21) Appl. No.: 16/790,851

(22) Filed: Feb. 14, 2020

(65) Prior Publication Data

US 2021/0026033 A1 Jan. 28, 2021

(51) Int. Cl.
*G01V 3/38* (2006.01)
*G01V 3/08* (2006.01)
*G01V 3/12* (2006.01)

(52) U.S. Cl.
CPC ............. *G01V 3/38* (2013.01); *G01V 3/082* (2013.01); *G01V 3/083* (2013.01); *G01V 3/12* (2013.01); *G01V 2003/085* (2013.01); *G01V 2003/086* (2013.01)

(58) Field of Classification Search
CPC .......... G01V 3/38; G01V 3/082; G01V 3/083; G01V 3/12; G01V 2003/085; G01V 2003/086
See application file for complete search history.

(56) References Cited

U.S. PATENT DOCUMENTS 10,312,596 B2 * 6/2019 Gregoire ................ H01Q 13/20

FOREIGN PATENT DOCUMENTS

CN 109407160 A * 3/2019

OTHER PUBLICATIONS

Lei et al., A Vector Based on WEM Finite Element Three-dimensional Method of Forwarding (CN109407160, Mar. 1, 2019) (Year: 2019).*

* cited by examiner

*Primary Examiner* — Natalie Huls
*Assistant Examiner* — Michael J Singletary

(57) ABSTRACT

A method for collecting and processing the tensor artificial-source electromagnetic signal data and a device thereof; the method comprising the steps of: step S1: determining an electric field polarization direction in a measuring area, and arranging electromagnetic field sensors according to the electric field polarization direction in the measuring area, step S2: respectively collecting artificial-source electromagnetic field signals and natural-field-source electromagnetic field signals, step S3: respectively Fourier-transforming the collected electromagnetic field signals, thereby obtaining the electromagnetic field values corresponding to the artificial source, and the collected electromagnetic field signals corresponding to n groups of natural sources, step S4: calculating to obtain the underground tensor impedances according to the electromagnetic field values corresponding to the artificial source and the electromagnetic field signals corresponding to n groups of natural sources that are obtained based on the least square method, step S5.

11 Claims, 4 Drawing Sheets

METHOD FOR COLLECTING AND PROCESSING TENSOR ARTIFICIAL-SOURCE ELECTROMAGNETIC SIGNAL DATA AND DEVICE THEREOF

TECHNICAL FIELD OF THE INVENTION

The present invention relates to the technical field of geophysical exploration, and more particularly, to a method for collecting and processing the tensor artificial-source electromagnetic signal data and a device thereof.

BACKGROUND OF THE INVENTION

Among various methods of geophysical exploration, the frequency-domain electromagnetic exploration method possesses high working efficiency and strong resolving ability. It is thus widely used in the exploration of the earth's internal structure and underground resources such as oil, gas, mineral and geothermal resources. According to different sources, the frequency-domain electromagnetic method can be mainly divided into two types: one is the method using a natural field source, such as the MT (Magneto Telluric) method, and the other is the method for transmitting electromagnetic signals by using an artificial source, such as the CSAMT (Controlled Source Audio Magneto Telluric) method.

In these methods, due to the adoption of a natural field source, the MT method is relatively weak in signal strength and is susceptible to various interferences. Although the signal strength of the CSAMT method adopting an artificial field source is strong, the arrangement of the transmitting source in the field is troublesome. Especially when the terrain is complex, it's normally difficult to find a suitable location for the transmitting source. To solve the aforesaid problem, combining the merits of both MT and CSAMT methods, a high-power fixed-source ultra-low frequency electromagnetic exploration method called "WEM" (Wireless Electro-Magnetic) has been developed. Its basic idea is to construct a fixed high-power electromagnetic signal transmitting source in a high-resistance area, wherein the length of the transmitting antenna can reach hundreds of kilometers, capable of generating electromagnetic field signal switch high signal-to-noise ratio that can achieve a nationwide coverage. This method can be applied to various exploration fields, such as seismic forecast, resource exploration and electrical structure survey, etc.

Presently, the power of the transmitter adopted in the WEM method is 500 kW, and the signals can be transmitted via a cross-shaped antenna. The length of a single transmitting antenna can reach 100 km, achieving a nationwide coverage of the transmitted signals. For considering the transmission cost and the efficiency of the field construction, the WEM method normally employs the single antenna transmission for data collection in a manner similar to that of a scalar CSAMT method. Namely, the receiver measures the electric field component Ex parallel to the transmitting source and the magnetic field component Hy perpendicular to the transmitting source, thereby obtaining the apparent resistivity (a parameter used for reflecting the variation of the rock's and ore's electrical conductivities; when the electrical distribution of underground rocks is non-uniform or the fluctuation of the land surface is uneven, the resistivity obtained by using the method and the calculation formula for calculating the uniform horizontal earth resistivity is called the apparent resistivity, which is symbolized by $\rho s$ and has the same unit $\Omega \cdot m$ as that of the resistivity) and the phase in a single direction along the measuring line. However, as the underground tensor impedance cannot be obtained by means of the aforesaid method, the specific analysis of stratum cannot be carried out, failing to meet more and more requirements of the three-dimensional geological exploration.

In conclusion, in the prior art, all the traditional artificial-source electromagnetic exploration methods and technologies (e.g., CSAMT and WEM methods) need two or more transmitting sources arranged in different directions to respectively transmit signals, thereby obtaining the tensor of the underground electrical impedance. As a result, a low working efficiency and a high cost are inevitable.

SUMMARY OF THE INVENTION

The purpose of the present invention is to solve the shortcomings in the prior art by providing a method for collecting and processing the tensor artificial-source electromagnetic signal data and a device thereof. According to the present invention, the purpose of obtaining the underground tensor impedances through transmitting signals by using a single antenna in one direction can be achieved, and the field construction of the traditional WEM (Wireless Electro-Magnetic) method and CSAMT (Controlled Source Audio Magneto Telluric) method can be simplified, greatly saving the cost while improving the working efficiency.

To achieve the above purpose, the present invention provides a method for collecting and processing the tensor artificial-source electromagnetic signal data, comprising the steps of:

Step S1: determining an electric field polarization direction in a measuring area, and arranging electromagnetic field sensors according to the electric field polarization direction in the measuring area;

Step S2: respectively collecting artificial-source electromagnetic field signals and natural-field-source electromagnetic field signals;

Step S3: respectively Fourier-transforming the collected electromagnetic field signals, thereby obtaining the electromagnetic field values $Ex_s$, $Ey_s$, $Hx_s$, and $Hy_s$ corresponding to the artificial source, and the collected electromagnetic field signals $Ex_i$, $Ey_i$, $Hx_i$ and $Hy_i$ corresponding to n groups of natural sources, wherein i=1:n;

Step S4: calculating to obtain the underground tensor impedances Zxx, Zxy, Zyx and Zyy according to the electromagnetic field values $Ex_s$, $Ey_s$, $Hx_s$, and $Hy_s$ corresponding to the artificial source and the electromagnetic field signals $Ex_i$, $Ey_i$, $Hx_i$ and $Hy_i$ corresponding to n groups of natural sources that are obtained based on the least square method;

Step S5: rotating the underground tensor impedances of all measuring points to the same direction, thereby completing the three-dimensional analysis and inversion of the whole measuring area.

In another preferred embodiment, step S1 further comprises the steps of:

Step S100: obtaining a polarization vector pattern of a high-power antenna surface electric field;

Step S101: determining the electric field polarization direction in the measuring area according to the obtained polarization vector pattern of the high-power antenna surface electric field and the actual relative position of the measuring area and the high-power transmitting source;

Step S102: according to the obtained electric field polarization direction in the measuring area, arranging sensors for collecting electric fields components Ex and Ey and sensors for collecting magnetic fields components Hx and Hy at different measuring points in the measuring area.

In another preferred embodiment, the corresponding relation between the positions of a plurality of measuring areas relative to the transmitting source and the electric field polarization angle are pre-established according to the obtained polarization vector pattern of the high-power antenna surface electric field. In the implementation, the corresponding relation can be queried according to the relative position of the measuring area and the transmitting source, thereby determining the polarization direction of the electric field in the measuring area.

In another preferred embodiment, each sensor of each measuring point is required to be arranged at an angle of 45-degree from the polarization direction of the electric field to ensure that the intensities of the artificial source electromagnetic field received in the two vertical directions are basically consistent.

In another preferred embodiment, the arrangement of each sensor needs to ensure that Ex and Ey are perpendicular, Hx and Hy are perpendicular and Ex and Hx are parallel.

In another preferred embodiment, in step S4, the tensor impedances Zxx, Zxy, Zyx, and Zyy can be obtained by optimally solving the following formula (one) by using the least square method:

$$\sum_{i=1}^{n} |(Ex_i - ZxxHx_i - ZxyHy_i) + \qquad \text{(Formula one)},$$
$$(Ey_i - ZyxHx_i - ZyyHy_i)|^2 + \alpha$$
$$|Wx(Ex_s - ZxxHx_s - ZxyHy_s) +$$
$$Wy(Ey_s - ZyxHx_s - ZyyHy_s)|^2 = \text{Min}.$$

wherein
Zxx, Zxy, Zyx and Zyy are the underground tensor impedances to be evaluated, $Ex_i$, $Ey_i$, $Hx_i$ and $Hy_i$ are the collected natural source data, $Ex_s$, $Ey_s$, $Hx_s$, and $Hy_s$ are the collected artificial source data, Wx and Wy are the data weights of the artificial source, and $\alpha$ is the weight of the artificial source signal.

In another preferred embodiment, assuming that the included angle between the sensor and the polarization direction of the electric field is $\beta$, the weight $W=1-\beta/90$.

In another preferred embodiment, the artificial source signal weight $\alpha$ is determined by the signal-to-noise ratio of the signal strength of the artificial source electric field, wherein the greater the signal-to-noise ratio is, the greater its value is.

The present invention also provides a device for collecting and processing the tensor artificial-source electromagnetic signal data, comprising: An electric field polarization direction determining unit used for determining the polarization direction of the electric field in the measuring area, wherein the electromagnetic field sensors can be arranged according to the determined polarization direction of the electric field in the measuring area;

An electromagnetic receiver used for respectively collecting artificial-source electromagnetic field signals and natural-field-source electromagnetic field signals;

A signal processing unit used for respectively Fourier-transforming the collected electromagnetic field signals, thereby obtaining the electromagnetic field values $Ex_s$, $Ey_s$, $Hx_s$, and $Hy_s$ corresponding to the artificial source, and the collected electromagnetic field signals $Ex_i$, $Ey_i$, $Hx_i$ and $Hy_i$ corresponding to n groups of natural sources, wherein i=1:n;

An underground tensor impedance calculating unit used for calculating to obtain the underground tensor impedances Zxx, Zxy, Zyx and Zyy according to the electromagnetic field values $Ex_s$, $Ey_s$, $Hx_s$, and $Hy_s$ corresponding to the artificial source and the electromagnetic field signals $Ex_i$, $Ey_i$, $Hx_i$ and $Hy_i$ corresponding to n groups of natural sources that are obtained based on the least square method; and An underground tensor impedance rotating unit used for rotating the underground tensor impedances of all measuring points to the same direction, thereby completing the three-dimensional analysis and inversion of the whole measuring area.

In another preferred embodiment, the electric field polarization direction determining unit obtains the polarization vector pattern of a high-power antenna surface electric field, and determines the polarization direction of the electric field in the measuring area according to the obtained polarization vector pattern of the electric field and the actual relative position of the measuring area and the high-power transmitting source.

Compared with the prior art, the present invention has the following advantages:

The present invention provides a method for collecting and processing the tensor artificial-source electromagnetic signal data and a device thereof. According to the determined electric field polarization direction in the measuring area, electric field sensors are arranged at different measuring points in the measuring area. Artificial-source electromagnetic field signals and natural-field-source electromagnetic field signals are respectively collected by using an electromagnetic receiver, and the collected electromagnetic field signals are Fourier-transformed, thereby obtaining the electromagnetic field values corresponding to the artificial source, and the collected electromagnetic field signals corresponding to n groups of natural sources. The underground tensor impedances are calculated and obtained according to the electromagnetic field values corresponding to the artificial source and the electromagnetic field signals corresponding to n groups of natural sources that are obtained based on the least square method. Finally, the underground tensor impedances of all measuring points are rotated to the same direction, thus completing the three-dimensional analysis and inversion of the whole measuring area. The present invention achieves the purpose of obtaining the underground tensor impedances through transmitting signals by using a single antenna in one direction, and simplifies the field construction of the traditional WEM (Wireless Electro-Magnetic) method and the CSAMT (Controlled Source Audio Magneto Telluric) method, greatly saving the cost while improving the working efficiency.

DETAILED DESCRIPTION OF THE INVENTION

Drawings and detailed embodiments are combined hereinafter to elaborate the technical principle of the present invention. The contents disclosed in the specification allow those skilled in the art to easily understand other advantages and effects of the present invention. The present invention may be practiced or performed through other embodiments, and the details of the description may be modified or altered based on different applications without departing from the spirit of the present invention.

Figure 1:
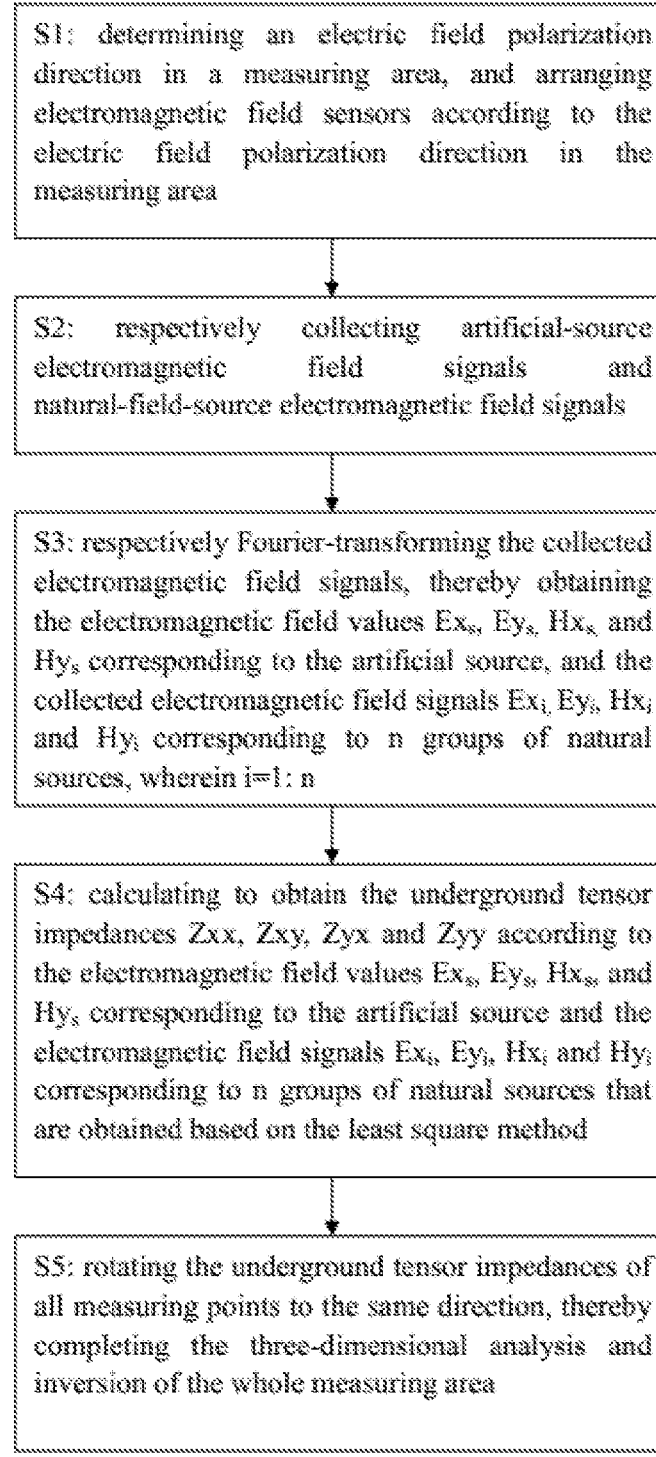
FIG. 1 is a flowchart illustrating a method for collecting and processing the tensor artificial-source electromagnetic signal data of the present invention.

FIG. 1 is a flowchart illustrating a method for collecting and processing the tensor artificial-source electromagnetic signal data of the present invention. As shown in FIG. 1, the method for collecting and processing the tensor artificial-source electromagnetic signal data of the present invention, comprising the steps of:

Step S1: determining an electric field polarization direction in a measuring area, and arranging electromagnetic field sensors according to the electric field polarization direction in the measuring area;

In an embodiment of the present invention, step S1 further comprises the steps of:

Step S100: obtaining a polarization vector pattern of a high-power antenna surface electric field; in the embodiment of the present invention, the polarization vector pattern of the high-power antenna surface electric field can be obtained based on a stratum-air layer-ionosphere coupling model; namely, the polarization angle of the high-power antenna surface electric field can be calculated and obtained through the stratum-air layer-ionosphere coupling model;

Step S101: determining the electric field polarization direction in the measuring area according to the obtained polarization vector pattern of the high-power antenna surface electric field and the actual relative position of the measuring area and the high-power transmitting source; specifically, in the embodiment, as the location of the transmitting source is known, and the location of the measuring area is determined, according to the relative position (e.g., the angle and the transmitting-receiving distance) of the measuring area and the transmitting source, and referring to the polarization vector pattern of the high-power antenna surface electric field, the electric field polarization direction in the measuring area can be obtained;

Preferably, in step S101, according to the obtained polarization vector pattern of the high-power antenna surface electric field, a corresponding relation between the relative position (e.g., the connection angle) of the measuring area and the transmitting source and the electric field polarization angle can be pre-established; in the embodiment, the corresponding relation is queried according to the actual relative position of the measuring area and the high-power transmitting source, thereby determining the electric field polarization direction in the measuring area;

Step S102: according to the obtained electric field polarization direction in the measuring area, arranging sensors for collecting electric fields components Ex and Ey and sensors for collecting magnetic fields components Hx and Hy at different measuring points in the measuring area; generally, each sensor of each measuring point is required to be arranged at an angle of 40-to-50-degree from the polarization direction of the electric field; in the embodiment of the present invention, each sensor of each measuring point is required to be arranged at an angle of 45-degree from the polarization direction of the electric field as much as possible to ensure that the intensities of the artificial source electromagnetic field received in the two vertical directions are basically consistent; the arrangement of each sensor needs to ensure that Ex and Ey are perpendicular, Hx and Hy are perpendicular and Ex and Hx are parallel;

Step S2: respectively collecting artificial-source electromagnetic field signals and natural-field-source electromagnetic field signals; in the present invention, the data collected by each sensor can be collected by an electromagnetic receiver; in one embodiment of the present invention, the electromagnetic receiver can respectively record the collected artificial-source electromagnetic field signals and the natural-field-source electromagnetic field signals through an artificial-source signal-collecting module and a natural-source signal-collecting module; specifically, the artificial-source signal-collecting module automatically collects signals collected by each sensor when the transmitting source transmits signals according to a preset transmitting frequency table, whereas the natural-source signal-collecting module automatically collects the natural field data collected by each sensor when the transmitting source stops transmitting; in another embodiment of the present invention, the electromagnetic receiver can select the collected data according to the transmitting time of the transmitting source and the transmitting frequency table, thereby obtaining the corresponding artificial-source electromagnetic field signals and the natural-field-source electromagnetic field signals; specifically, as the data collected by the sensor is the data in a time sequence (voltage values that vary over time), the corresponding time sequence may be taken as the artificial source data according to the transmitting time and the transmitting frequency table (the transmitting time, the transmitting frequency and the length of the transmitting time are preset before the signal transmission); for the natural source data, the signals generated by the transmitting source can be removed as an interference by adopting the traditional MT(Magneto-Telluric) method, thereby obtaining the natural source data; it's worth mentioning that the present invention is not limited thereto;

Step S3: respectively Fourier-transforming the collected electromagnetic field signals, thereby obtaining the electromagnetic field values $Ex_s$, $Ey_s$, $Hx_s$, and $Hy_s$ corresponding to the artificial source, and the collected electromagnetic field signals $Ex_i$, $Ey_i$, $Hx_i$ and $Hy_i$ corresponding to n groups of natural sources, wherein i=1:n; as the Fourier transformation belongs to the prior art, which is briefly described herein;

Step S4: calculating to obtain the underground tensor impedances Zxx, Zxy, Zyx and Zyy according to the electromagnetic field values $Ex_s$, $Ey_s$, $Hx_s$, and $Hy_s$ corresponding to the artificial source and the electromagnetic field signals $Ex_i$, $Ey_i$, $Hx_i$ and $Hy_i$ corresponding to n groups of natural sources that are obtained based on the least square method;

For the data obtained by the field observation contains noise, in the present invention, the tensor impedances Zxx, Zxy, Zyx, and Zyy can be obtained by optimally solving the following formula (one) by using the least square method:

$$\sum_{i=1}^{n} |(Ex_i - ZxxHx_i - ZxyHy_i) + \quad \text{(Formula one)},$$

-continued $$(Ey_i - ZyxHx_i - ZyyHy_i)|^2 + \alpha$$

$$|Wx(Ex_s - ZxxHx_s - ZxyHy_s) +$$

$$Wy(Ey_s - ZyxHx_s - ZyyHy_s)|^2 = \text{Min.}$$

wherein
Zxx, Zxy, Zyx and Zyy are the underground tensor impedances to be evaluated, $Ex_i$, $Ey_i$, $Hx_i$ and $Hy_i$ are the collected natural source data, $Ex_s$, $Ey_s$, $Hx_s$, and $Hy_s$ are the collected artificial source data, Wx and Wy are the data weights of the artificial source, and α is the weight of the artificial source signal; in the embodiment of the present invention, Wx and Wy can be determined according to the included angle between the direction of the sensor actually arranged in the field and the polarization direction of the electric field; specifically, assuming that the included angle between the sensor direction and the polarization direction of the electric field is β, the weight W=1−β/90; in the embodiment of the present invention, β is preferably a 45-degree angle for ensuring that the signal strength of transmitting sources in X and Y directions are consistent and the weights of the two directions are equal; the artificial source signal weight α is determined by the signal-to-noise ratio of the signal strength of the artificial source electric field; the greater the signal-to-noise ratio is, the greater its value is, wherein the calculation formula is α=20×lg(s/n);

Step S5: rotating the underground tensor impedances of all measuring points to the same direction, thereby completing the three-dimensional analysis and inversion of the whole measuring area; specifically, after obtaining the underground tensor impedances Zxx, Zxy, Zyx and Zyy through step S4, the underground tensor impedances of all measuring points are rotated to the same direction by using the impedance rotation formula of the traditional MT (Magneto-Telluric)method, thereby completing the three-dimensional analysis and inversion of the whole measuring area, namely, completing the three-dimensional exploration of the measuring area.

Figure 2:
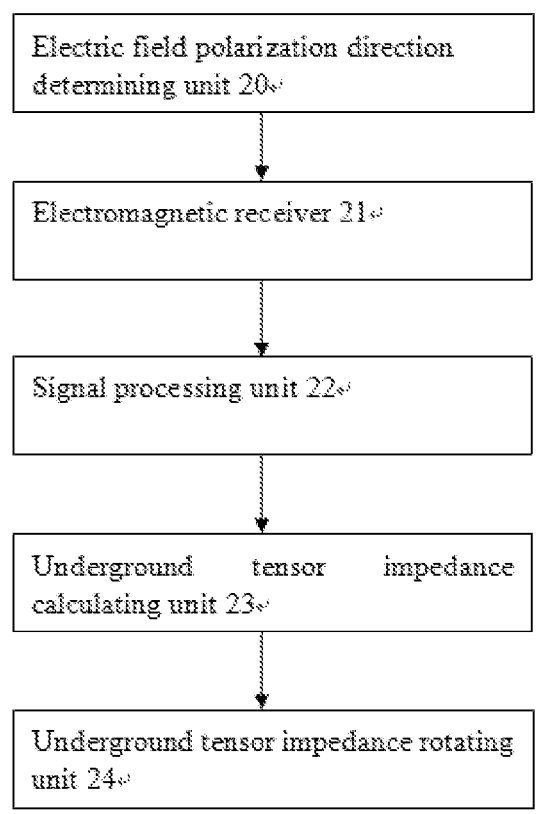
FIG. 2 is a system architecture diagram of a device for collecting and processing the tensor artificial-source electromagnetic signal data of the present invention.

FIG. 2 is a system architecture diagram of a device for collecting and processing the tensor artificial-source electromagnetic signal data. As shown in FIG. 2, the device for collecting and processing the tensor artificial-source electromagnetic signal data of the present invention, comprising:

An electric field polarization direction determining unit 20 used for determining the polarization direction of the electric field in the measuring area, wherein the electromagnetic field sensors can be arranged according to the determined polarization direction of the electric field in the measuring area;

In one embodiment of the present invention, the electric field polarization direction determining unit 20 obtains the polarization vector pattern of a high-power antenna surface electric field, and determines the polarization direction of the electric field in the measuring area according to the obtained polarization vector pattern of the high-power antenna surface electric field and the actual relative position of the measuring area and the high-power transmitting source; specifically, the electric field polarization direction determining unit 20 obtains the polarization vector pattern of the high-power antenna surface electric field based on the stratum-air layer-ionosphere coupling model, namely, calculating to obtain the polarization angle of the high-power antenna surface electric field through the stratum-air layer-ionosphere coupling model, and determining the polarization direction of the electric field in the measuring area according to the obtained polarization vector pattern of the high-power antenna surface electric field and the actual relative position of the measuring area and the high-power transmitting source;

In another embodiment of the present invention, the electric field polarization direction determining unit 20 obtains the polarization vector pattern of the high-power antenna surface electric field based on the stratum-air layer-ionosphere coupling model, and pre-establishes the corresponding relation between the relative positions (e.g., the connection angle) of a plurality of measuring areas and the transmitting source and the electric field polarization angle according to the obtained polarization vector pattern of the high-power antenna surface electric field; in the implementation, the corresponding relation can be queried according to the connection angle between the center of the receiving area (i.e., the measuring area) and the center of the high-power transmitting antenna, thereby determining the polarization direction of the electric field in the measuring area;

After the polarization direction of the electric field in the measuring area is determined, the sensors for collecting the electric field components Ex and Ey and the magnetic field components Hx and Hy can be arranged at different measuring points in the measuring area according to the obtained polarization direction of the electric field in the measuring area; in the embodiment of the present invention, each sensor of each measuring point is required to be arranged at an angle of 45-degree from the polarization direction of the electric field as much as possible to ensure that the intensities of the artificial source electromagnetic field received in the two vertical directions are basically consistent; the arrangement of each sensor needs to ensure that Ex and Ey are perpendicular, Hx and Hy are perpendicular and Ex and Hx are parallel;

An electromagnetic receiver 21 used for respectively collecting artificial-source electromagnetic field signals and natural-field-source electromagnetic field signals; in the present invention, the electromagnetic receiver 21 comprises an artificial-source signal-collecting module 211 and a natural-source signal-collecting module 212 for respectively recording artificial-source electromagnetic field signals and natural-field-source electromagnetic field signals; specifically, the artificial-source signal-collecting module 211 automatically collects signals collected by each sensor when the transmitting source transmits signals according to a preset transmitting frequency table, whereas the natural-source signal-collecting module 212 automatically collects the natural field data collected by each sensor when the transmitting source stops transmitting; in another embodiment of the present invention, the electromagnetic receiver 21 can select the collected data according to the transmitting time of the transmitting source and the transmitting frequency table, thereby obtaining the corresponding artificial-source electromagnetic field signals and the natural-field-source electromagnetic field signals; specifically, as the data collected by the sensor is the data in a time sequence (voltage values that vary over time), the corresponding time sequence may be taken as the artificial source data according to the transmitting time and the transmitting frequency table (the transmitting time, the transmitting frequency and the length of the transmitting time are preset before the signal transmission); for the natural source data, the signals generated by the transmitting source can be removed as an interference by adopting the traditional MT(Magneto-Telluric) method, thereby obtaining the natural source data; it's worth mentioning that the present invention is not limited thereto;

A signal processing unit 22 used for respectively Fourier-transforming the collected electromagnetic field signals, thereby obtaining the electromagnetic field values $Ex_s$, $Ey_s$, $Hx_s$, and $Hy_s$ corresponding to the artificial source, and the collected electromagnetic field signals $Ex_i$, $Ey_i$, $Hx_i$ and $Hy_i$ corresponding to n groups of natural sources, wherein i=1:n; as the Fourier transformation belongs to the prior art, which is briefly described herein;

An underground tensor impedance calculating unit 23 used for calculating to obtain the underground tensor impedances Zxx, Zxy, Zyx and Zyy according to the electromagnetic field values $Ex_s$, $Ey_s$, $Hx_s$, and $Hy_s$ corresponding to the artificial source and the electromagnetic field signals $Ex_i$, $Ey_i$, $Hx_i$ and $Hy_i$ corresponding to n groups of natural sources that are obtained based on the least square method;

For the data obtained by the field observation contains noise, in the present invention, the tensor impedances Zxx, Zxy, Zyx, and Zyy can be obtained by optimally solving the following formula (one) by using the least square method:

$$\sum_{i=1}^{n} |(Ex_i - ZxxHx_i - ZxyHy_i) + (Ey_i - ZyxHx_i - ZyyHy_i)|^2 + \alpha$$
$$|Wx(Ex_s - ZxxHx_s - ZxyHy_s) + Wy(Ey_s - ZyxHx_s - ZyyHy_s)|^2 = \text{Min.}$$

(Formula one), wherein
Zxx, Zxy, Zyx and Zyy are the underground tensor impedances to be evaluated, $Ex_i$, $Ey_i$, $Hx_i$ and $Hy_i$ are the collected natural source data, $Ex_s$, $Ey_s$, $Hx_s$, and $Hy_s$ are the collected artificial source data, Wx and Wy are the data weights of the artificial source, and α is the weight of the artificial source signal; in the embodiment of the present invention, Wx and Wy can be determined according to the included angle between the direction of the sensor actually arranged in the field and the polarization direction of the electric field; specifically, assuming that the included angle between the sensor direction and the polarization direction of the electric field is β, the weight W=1−β/90; the artificial source signal weight α is determined by the signal-to-noise ratio of the signal strength of the artificial source electric field; the greater the signal-to-noise ratio is, the greater its value is, wherein the calculation formula is α=20×1g(s/n);

An underground tensor impedance rotating unit 24 used for rotating the underground tensor impedances of all measuring points to the same direction, thereby completing the three-dimensional analysis and inversion of the whole measuring area; specifically, after obtaining the underground tensor impedances Zxx, Zxy, Zyx and Zyy through step S4, the underground tensor impedance rotating unit 24 rotates the underground tensor impedances of all measuring points to the same direction by using the impedance rotation formula of the traditional MT (Magneto-Telluric)method, thereby completing the three-dimensional analysis and inversion of the whole measuring area, namely, completing the three-dimensional exploration of the measuring area.

Figure 3:
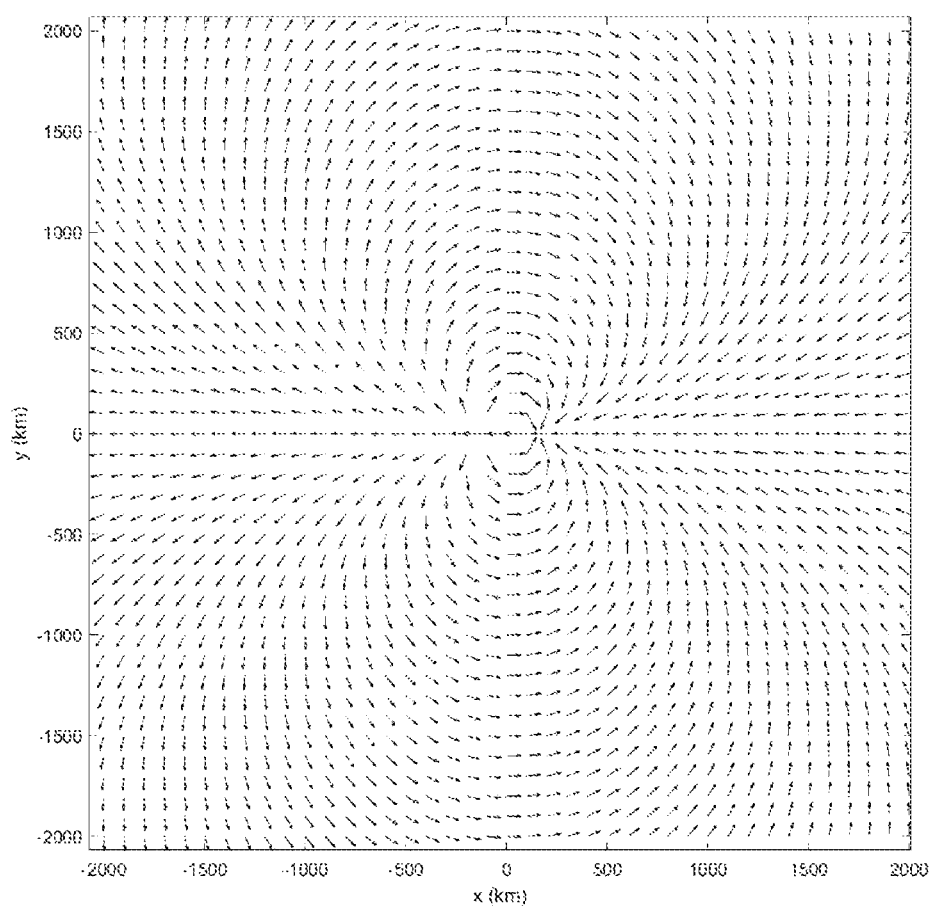
FIG. 3 is a polarization vector pattern of a high-power antenna surface electric field in the embodiment of the present invention.

The present invention is further described through a specific embodiment in following:

First, a polarization vector pattern of a high-power antenna surface electric field is obtained based on the stratum-air layer-ionosphere coupling model, namely, as shown in FIG. 3, obtaining the polarization angle of the high-power antenna surface electric field. According to the obtained polarization vector pattern of the surface electric field and the actual relative position of the measuring area and the high-power transmitting source, the polarization angle of the electric field can be obtained. Namely, according to the relative position (e.g., the angle and the transmitting-receiving distance) of the measuring area and the transmitting source, and referring to FIG. 3 (the transmitting source is in the middle), the electric field polarization angle in the measuring area can be determined. In the embodiment of the present invention, according to the connection angle between the center of the measuring area and the center of the high-power transmitting antenna, and the pre-established corresponding relation between the connection angle between the measuring area and the transmitting source and the electric field polarization angle, the electric field polarization angle in the measuring area can also be determined. The pre-established corresponding relation is shown in Table 1 as below:

TABLE 1

| Connection Angle between the Measuring Area and the Transmitting Source | Electric Field Polarization Angle |
|---|---|
| 0° to 15° | 90° |
| 15° to 30° | 45° |
| 30° to 60° | 0° |
| 60° to 75° | 45° |
| 75° to 90° | 90° |

In the field work, sensors for collecting electric fields components Ex and Ey and sensors for collecting magnetic fields components Hx and Hy are respectively arranged. In the embodiment of the present invention, each sensor of each measuring point is required to be arranged at an angle of 45-degree from the polarization direction of the electric field as much as possible to ensure that the intensities of the artificial source electromagnetic field received in the two vertical directions are basically consistent. The arrangement of each sensor needs to ensure that Ex and Ey are perpendicular, Hx and Hy are perpendicular and Ex and Hx are parallel.

Figure 4:
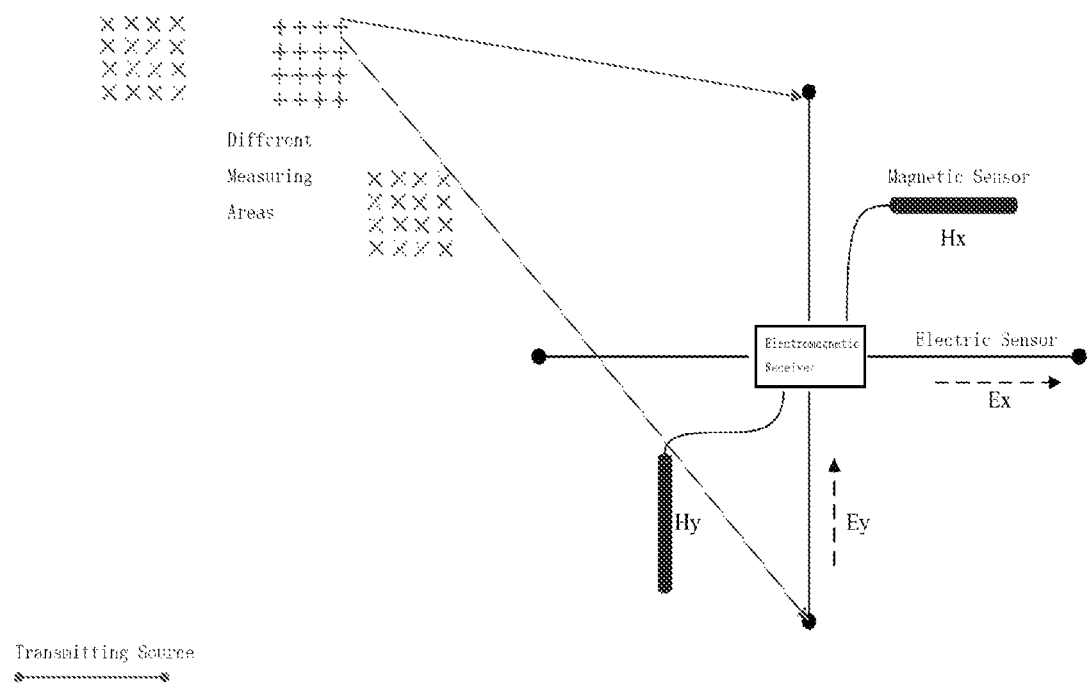
FIG. 4 is a schematic diagram illustrating the electromagnetic receiver collecting the data of each sensor in the embodiment of the present invention.

During the process of collecting electromagnetic signal data, the data can be collected by using an electromagnetic receiver. As shown in FIG. 4, the receiver comprises an artificial-source signal-collecting module and a natural-source signal-collecting module for respectively recording the collected artificial-source electromagnetic field signals and the natural-field-source electromagnetic field signals. After Fourier-transforming the collected electromagnetic field signals, the electromagnetic field values $Ex_s$, $Ey_s$, $Hx_s$, and $Hy_s$ corresponding to the artificial source and the collected electromagnetic field signals $Ex_i$, $Ey_i$, $Hx_i$ and $Hy_i$ corresponding to n groups of natural sources can be obtained, wherein i=1:n.

For the data obtained by the field observation contains noise, in the present invention, the tensor impedances Zxx, Zxy, Zyx, and Zyy can be obtained by optimally solving the following formula (one) by using the least square method:

$$\sum_{i=1}^{n} |(Ex_i - ZxxHx_i - ZxyHy_i) + (Ey_i - ZyxHx_i - ZyyHy_i)|^2 + \alpha$$
$$|Wx(Ex_s - ZxxHx_s - ZxyHy_s) + Wy(Ey_s - ZyxHx_s - ZyyHy_s)|^2 = \text{Min.}$$

(Formula one), wherein Zxx, Zxy, Zyx and Zyy are the underground tensor impedances to be evaluated, $Ex_i$, $Ey_i$, $Hx_i$ and $Hy_i$ are the collected natural source data, and Wx and Wy are the data weights of the artificial source, wherein Wx and Wy can be strictly determined according to the included angle between the direction of the sensor actually arranged in the field and the polarization direction of the electric field. Assuming that the included angle between the sensor direction and the polarization direction of the electric field is β, the weight W=1−β/90; α is the artificial source signal weight, and is determined by the signal-to-noise ratio of the signal strength of the artificial source electric field. The greater the signal-to-noise ratio is, the greater its value is, wherein the calculation formula is α=20×lg(s/n).

After calculating to obtain the underground tensor impedances Zxx, Zxy, Zyx and Zyy, the underground tensor impedances of all measuring points are rotated to the same direction by using the impedance rotation formula of the traditional MT (Magneto-Telluric)method, thereby completing the three-dimensional analysis and inversion of the whole measuring area, namely, completing the three-dimensional exploration of the measuring area.

In conclusion, the present invention provides a method for collecting and processing the tensor artificial-source electromagnetic signal data and a device thereof. According to the determined electric field polarization direction in the measuring area, electric field sensors are arranged at different measuring points in the measuring area. Artificial-source electromagnetic field signals and natural-field-source electromagnetic field signals are respectively collected by using an electromagnetic receiver, and the collected electromagnetic field signals are Fourier-transformed, thereby obtaining the electromagnetic field values corresponding to the artificial source, and the collected electromagnetic field signals corresponding to n groups of natural sources. The underground tensor impedances are calculated and obtained according to the electromagnetic field values corresponding to the artificial source and the electromagnetic field signals corresponding to n groups of natural sources that are obtained based on the least square method. Finally, the underground tensor impedances of all measuring points are rotated to the same direction, thus completing the three-dimensional analysis and inversion of the whole measuring area. The present invention achieves the purpose of obtaining the underground tensor impedances through transmitting signals by using a single antenna in one direction. Moreover, by means of the present invention, the transmitting cost of the ultra-low frequency electromagnetic method can be greatly reduced, the field working efficiency can be significantly improved, and the practicability of the method can be effectively enhanced.

Meanwhile, the present invention provides a new development direction for the construction and data-processing of all artificial-source electromagnetic exploration methods, and simplifies the field construction of the traditional WEM (Wireless Electro-Magnetic) method and the CSAMT (Controlled Source Audio Magneto Telluric) method, greatly saving the cost while improving the working efficiency.

The above embodiments are only used to illustrate the principle and efficacy of the present invention, and should not be construed as to limit the present invention in any way. Modifications and variations can be made to the embodiments described above by those skilled in the art without departing from the spirit and scope of the present invention. Therefore, the scope of the present invention shall be defined by the claims.

The invention claimed is:

1. A method for collecting and processing tensor artificial-source electromagnetic signal data, comprising the steps of:
   step S1: determining an electric field polarization direction in a measuring area, and arranging electromagnetic field sensors according to the electric field polarization direction in the measuring area,
   step S2: respectively collecting artificial-source electromagnetic field signals and natural-field-source electromagnetic field signals,
   step S3: respectively Fourier-transforming the collected electromagnetic field signals, thereby obtaining electromagnetic field values $Ex_s$, $Ey_s$, $Hx_s$, and $Hy_s$ corresponding to the artificial source, and the collected electromagnetic field signals $Ex_i$, $Ey_i$, $Hx_i$ and $Hy_i$ corresponding to n groups of natural sources, wherein i=1:n,
   step S4: obtain the underground tensor impedances Zxx, Zxy, Zyx and Zyy according to the electromagnetic field values $Ex_s$, $Ey_s$, $Hx_s$, and $Hy_s$, corresponding to the artificial source and the electromagnetic field signals $Ex_i$, $Ey_i$, $Hx_i$ and $Hy_i$ corresponding to n groups of natural sources that are obtained based on the least square method,
   step S5: rotating the underground tensor impedances of all measuring points to the same direction, thereby completing the three-dimensional analysis and inversion of the whole measuring area.

2. The method for collecting and processing tensor artificial-source electromagnetic signal data of claim 1, wherein step S1 further comprises the steps of:
   step S100: obtaining a polarization vector pattern of a high-power antenna surface electric field,
   step S101: determining the electric field polarization direction in the measuring area according to the obtained polarization vector pattern of the high-power antenna surface electric field and the actual relative position of the measuring area and the high-power transmitting source,
   step S102: according to the obtained electric field polarization direction in the measuring area, arranging sensors for collecting electric fields components Ex and Ey and sensors for collecting magnetic fields components Hx and Hy at different measuring points in the measuring area.

3. The method for collecting and processing tensor artificial-source electromagnetic signal data of claim 2, wherein in step S101, the corresponding relation between the positions of a plurality of measuring areas relative to the transmitting source and the electric field polarization angle are pre-established according to the obtained polarization vector pattern of the high-power antenna surface electric field, wherein in the implementation, the corresponding relation can be queried according to the relative position of the measuring area and the transmitting source, thereby determining the polarization direction of the electric field in the measuring area.

4. The method for collecting and processing tensor artificial-source electromagnetic signal data of claim 2, wherein each sensor of each measuring point is required to be arranged at an angle of 45-degree from the polarization direction of the electric field to ensure that the intensities of the artificial source electromagnetic field received in the two vertical directions are basically consistent.

5. The method for collecting and processing tensor artificial-source electromagnetic signal data of claim 4, wherein the arrangement of each sensor needs to ensure that Ex and Ey are perpendicular, Hx and Hy are perpendicular and Ex and Hx are parallel.

6. The method for collecting and processing tensor artificial-source electromagnetic signal data of claim 1, wherein in step S4, the tensor impedances Zxx, Zxy, Zyx, and Zyy can be obtained by optimally solving the following formula by using the least square method:

$$P = \sum_{i=1}^{n} |(Ex_i - ZxxHx_i - ZxyHy_i) +$$
$$(Ey_i - ZyxHx_i - ZyyHy_i)|^2 + \alpha$$
$$|Wx(Ex_s - ZxxHx_s - ZxyHy_s) +$$
$$Wy(Ey_s - ZyxHx_s - ZyyHy_s)|^2 = \text{Min}.$$

wherein Zxx, Zxy, Zyx and Zyy are the underground tensor impedances to be evaluated, $Ex_i$, $Ey_i$, $Hx_i$ and $Hy_i$ are the collected natural source data, $Ex_s$, $Ey_s$, $Hx_s$, and $Hy_s$ are the collected artificial source data, Wx and Wy are the data weights of the artificial source, and a is the weight of the artificial source signal.

7. The method for collecting and processing tensor artificial-source electromagnetic signal data of claim 6, wherein assuming that the included angle between the sensor and the polarization direction of the electric field is β, the weight W=1−β/90.

8. The method for collecting and processing tensor artificial-source electromagnetic signal data of claim 6, wherein the artificial source signal weight α is determined by the signal-to-noise ratio of the signal strength of the artificial source electric field, wherein the greater the signal-to-noise ratio is, the greater its value is.

9. A device for collecting and processing tensor artificial-source electromagnetic signal data, comprising:

an electric field polarization direction determining unit used for determining the polarization direction of the electric field in the measuring area, wherein the electromagnetic field sensors are arranged according to the determined polarization direction of the electric field in the measuring area, an electromagnetic receiver used for respectively collecting artificial-source electromagnetic field signals and natural-field-source electromagnetic field signals, a signal processing unit used for respectively Fourier-transforming the collected electromagnetic field signals, thereby obtaining electromagnetic field values $Ex_s$, $Ey_s$, $Hx_s$, and $Hy_s$ corresponding to the artificial source, and the collected electromagnetic field signals $Ex_i$, $Ey_i$, $Hx_i$ and $Hy_i$ corresponding to n groups of natural sources, wherein i=1:n, an underground tensor impedance calculating unit used for calculating to obtain the underground tensor impedances Zxx, Zxy, Zyx and Zyy according to the electromagnetic field values $Ex_s$, $Ey_s$, $Hx_s$, and $Hy_s$ corresponding to the artificial source and the electromagnetic field signals $Ex_i$, $Ey_i$, $Hx_i$ and $Hy_i$ corresponding to n groups of natural sources that are obtained based on the least square method, and an underground tensor impedance rotating unit used for rotating the underground tensor impedances of all measuring points to the same direction, thereby completing the three-dimensional analysis and inversion of the whole measuring area.

10. The device for collecting and processing tensor artificial-source electromagnetic signal data of claim 9, wherein the electric field polarization direction determining unit obtains the polarization vector pattern of a high-power antenna surface electric field, and determines the polarization direction of the electric field in the measuring area according to the obtained polarization vector pattern of the electric field and the actual relative position of the measuring area and the high-power transmitting source.

11. The method for collecting and processing tensor artificial-source electromagnetic signal data of claim 3, wherein each sensor of each measuring point is required to be arranged at an angle of 45-degree from the polarization direction of the electric field to ensure that the intensities of the artificial source electromagnetic field received in the two vertical directions are basically consistent.

* * * * *